Sept. 22, 1931.  A. ALLEN  1,824,746
MEASURING MECHANISM
Filed July 6, 1927   2 Sheets-Sheet 1
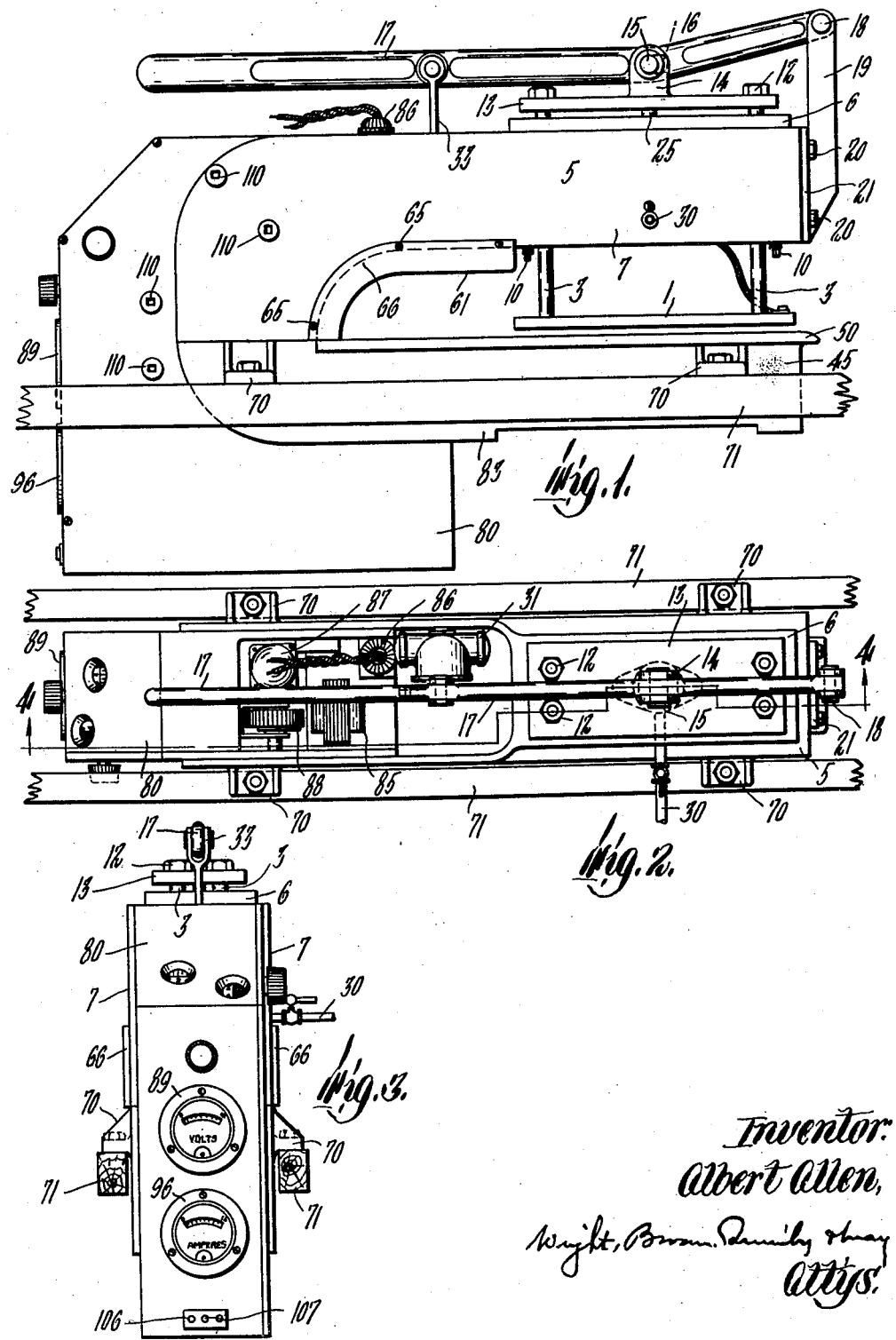
Inventor:
Albert Allen,
Wright, Brown, Quinby & May
Attys.

Sept. 22, 1931.   A. ALLEN   1,824,746
MEASURING MECHANISM

Filed July 6, 1927   2 Sheets-Sheet 2

Inventor:
Albert Allen,
by Wright, Brown
Quimby & Many
Attys.

Patented Sept. 22, 1931

1,824,746

UNITED STATES PATENT OFFICE

ALBERT ALLEN, OF WINCHESTER, MASSACHUSETTS, ASSIGNOR TO ATLANTIC PRECISION INSTRUMENT COMPANY, OF BOSTON, MASSACHUSETTS, A CORPORATION OF MASSACHUSETTS

MEASURING MECHANISM

Application filed July 6, 1927. Serial No. 203,790.

This invention relates to measuring mechanisms of the general type disclosed in my applications Serial Number 27,327 filed May 1, 1925, for indicating and controlling method and mechanism for paper making machines and the like, now Patent No. 1,708,074, dated April 9, 1929, and Serial Number 166,705, filed February 8, 1927, for means for measuring characteristics of material. In the mechanisms therein illustrated the material to be measured is passed between fixedly spaced conducting plates, thus forming a part of the dielectric therebetween, the capacity of the condenser formed by the plates and the dielectric being thus responsive in some measure to the mass and dielectric constant of the material between the plates. The measurement of the capacity due to the presence of the material between the plates and the indication of variations in such capacity due to corresponding variations in material, is shown as effected by the use of a pair of high frequency, oscillatory circuits which are tuned near to resonance with each other, one of these circuits having the condenser comprising the plates and interposed material as a tuning element and one circuit inducing flow in the other variable in accordance with the extent of detuning between the two circuits. In both of those applications the oscillatory circuits coupled together to form a high frequency transformer are shown as contained within a casing separate from the mounting mechanism for the condenser plates between which the material to be measured is passed.

In the construction of the present invention these oscillatory circuits are contained within a casing supported by the condenser plate carrying mechanism, the whole presenting a compact unitary structure which may be supported on any convenient part such as the frame of a machine through which the material to be measured is passed. The indicator mechanism may be positioned in any desired location, being connected by conducting wires to the appropriate mechanism carried by the casing.

This invention also has for one of its objects improvement in the condenser plate supporting mechanism by which the effects of heat variations in the material being measured may not introduce errors due to variations of condenser plate spacing, and whereby the particular position of the material between the plates shall have no effect on the indication.

A further feature of the invention relates to improved mechanism for separating the plates.

For a more complete understanding of this invention, reference may be had to the accompanying drawings in which Figure 1 is a side elevation of the condenser plates and related mechanism.

Figure 2 is a top plan of the same.

Figure 3 is an end elevation.

Figure 4:
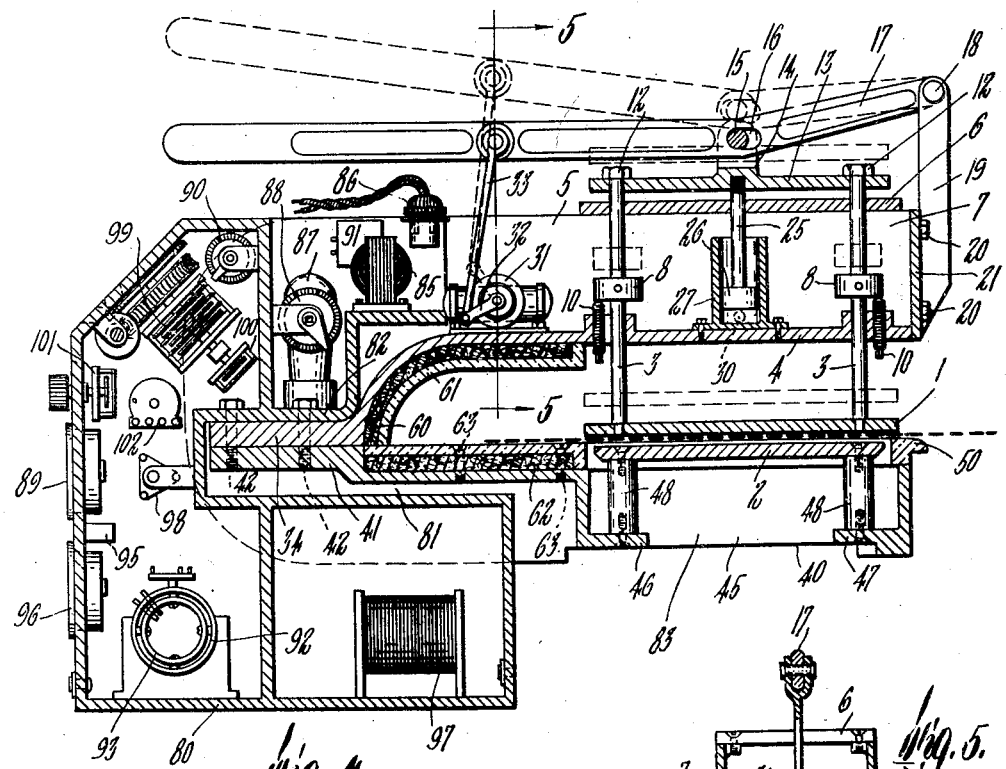
Figure 4 is a section on line 4—4 of Figure 2.

Referring to Figures 1 to 4 the condenser plates between which the material is passed are shown at 1 and 2. The condenser plate 1 is fixed to the lower ends of four supporting rods 3, which are preferably made of some material with a nearly zero temperature coefficient. These rods 3 are passed through the lower wall 4 of the upper jaw member 5 and through a cover plate 6 bridging the upper edges of the side members 7 of this jaw. The lower position of the condenser plate 1 is determined by impingement of collars 8 fixed to each of the rods 3 on the upper ends of adjusting screws 10 threaded through the wall 4. Above the top plate 6 the rods 3 engage with their heads 12 the upper face of a connecting plate 13. This plate 13 is provided with a pair of upstanding ears 14 between which passes a pin 15 extending through a slot 16 in a lever 17. This lever 17 is fulcrumed at 18 in a bracket member 19 fixed as by means of the bolts 20 to the end plate 21 of the jaw member 5. By means of the lever 17 the plate 13 may be raised so as to space the condenser plate 1 further from the plate 2 than when in its normal operative condition, this to facilitate threading of the material to be measured between the plates, and for inspection and cleaning.

As herein shown also this separation of the plates may be effected by power means. For this purpose the plate 13 has fixed thereto a piston rod 25 to the lower end of which is fixed a piston 26 riding in a vertical cylinder 27 fixed to the upper face of the wall 4. By means of the pipe connection 30 compressed air or other fluid under pressure may be admitted beneath the piston 26 so as to move this piston upwardly and raise the plate 1. In order that the plate may be returned with a cushioned movement to its normal properly spaced position for operation, any suitable means such as the door check shown at 31 may be employed, this door check having an arm 32 connected by means of the pivotal link 33 to the lever 17. The jaw portion 5 forms the upper part of a generally U shaped supporting frame, its end portion removed from the condenser supporting rods 3 and constituting the bend of the U being shown as downwardly curved and ending in a flange portion 34.

Figure 5:
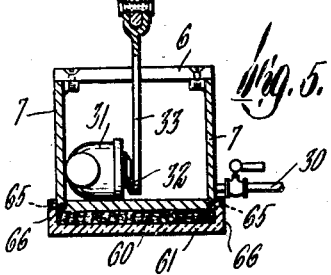
Figure 5 is a section on line 5—5 of Figure 4.

In spaced relation to the jaw portion 5 is a jaw portion 40 having at its rear end a flange 41 underlying the flange 34 and arranged to be fixed thereto as by means of the bolts 42. The jaw portion 40 is provided with side members 45 and opposite to the plate 1 is provided with depressed seat portions 46 and 47 on which are supported posts 48 of suitable insulating material to the upper ends of which is fixed the lower condenser plate 2. It will be noted that the whole condenser plate 2 is insulated from the supporting jaws while the upper plate 1 is in electrical connection therewith. It is desirable to prevent the material passing between the condenser plates from contact with either and as this contact is more likely to occur against the lower plate, the device being intended to operate with the plates arranged substantially horizontally, a rim 50 surrounding the lower plate 2 and projecting sufficiently above its upper face to prevent the materials being measured from contact therewith may be employed. In order, however, that this rim may not have any effect to vary the capacity of the condenser with their interposed material to be measured due to the position of the material to be measured between these plates, this rim should be of non-conducting material as, for example, rubber or bakelite. It has been found in practice that this mechanism is extremely sensitive to temperature changes acting on the condenser plate supporting jaws, and as it often happens that the material to be measured is in a more or less heated condition, as for example, when it comprises fabric having rubber frictioned thereon, or paper as it comes from the drier rolls, one object of this invention is to provide means for preventing the temperature of the material from being effective to change the spacing of the condenser plates and thus introduce errors in the measuring indication. For this purpose the U shaped portion of the jaws where they are joined together is shown as provided with a non-heat-conducting layer to prevent the heat from the material being measured from reaching this portion of the condenser plate supports. As shown in Figures 4 and 5, a layer of heat insulating material such as mineral wool is positioned at 60 along the under face of the upper jaw 5 and is held in position by means of a cover 61 of rubber or other suitable material. The upper face of the lower jaw 45 is provided with a similar layer of mineral wool or other non-conducting material as at 62, this being shown as held in position by an extended portion of the rim member 50. This member 50 may be fixed in position as by means of the screws 63 passing through it and the insulating material and threaded into the lower jaw portion, and the insulating lining 60 may be fixed to the upper jaw member 5 as by screws 65 passed through the side walls 66 of the casing member 61 and into the side wall portions 7 of the jaw 5.

For the purpose of supporting the jaws on the machine, or on any suitable frame work, the lower jaw member 45 may be provided with outwardly extending lugs 70 which may be carried on suitably spaced frame members 71 and bolted or otherwise fixed thereto.

According to the present invention the jaw members are utilized to support the high frequency circuit devices so as to provide a single unitary structure which may be attached to the machine through which the material to be measured is passed while permitting the indicating mechanism per se to be positioned at any convenient point. For this purpose a casing indicated at 80 and designed to carry the oscillatory circuit devices is fixed to the jaw members. As shown best in Figure 4 this casing comprises a somewhat U-shaped box member having an opening 81 to receive the flange members 34 and 41 of the jaws, this opening having an upper wall 82 which may be fixed to the flange members 34 by the bolts 42. This casing fits between the side members 7 of the upper jaw and the corresponding side members 83 of the lower jaw and is suitably partitioned to support the various mechanisms of the oscillatory circuits and protect them from injury and to suitably shield them from outside disturbing electrical influence.

Figure 6:
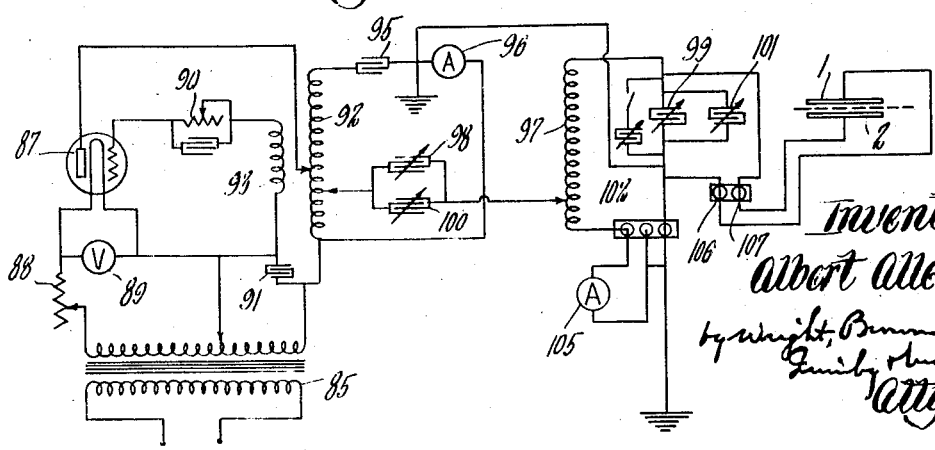
Figure 6 is a wiring diagram.

In Figure 6 is shown diagrammatically the various mechanisms which may be employed in these circuits which as illustrated are substantially as shown in my application Serial Number 166,705 hereinbefore referred to. Referring to this figure, at 85 is illustrated a transformer, the primary of which is connected to any suitable supply of alternating current as by means of the plug and wire connection 86. At 87 is shown a three element tube such as may be used by a low power radio transmitter, the current supply to which from the secondary of the transformer 85 is controlled by means of a rheostat 88. A voltmeter at 89 shows to the operator the voltage across the filament of the tube. At 90 is shown a leak and condenser in the grid circuit of the tube and at 91 is shown a blocking condenser. 92 and 93 indicate inductances, the coupling between which may be varied as desired. At 95 is shown a fixed condenser, and at 96 an ammeter for showing the current flow in the primary circuit. The secondary circuit comprises an inductance 97 coupled at a point intermediate its ends by means of a variable condenser 98 to the primary circuit. At 99 is shown the main tuning condenser of the secondary circuit, with which is also connected a small variable condenser 100 in parallel with the coupling condenser 98 by which, as more fully described in my application Serial No. 166,705, the coupling between the two circuits may remain substantially unvariable with variations in the capacity of the secondary circuit. This condenser 99 is employed to change the setting of the apparatus when it is desired to adjust the mechanism for definite weight of material, departures from which in either direction are shown by movements of the indicator needle on one or the other side of a null position. At 101 is shown a small variable condenser which is used for establishing small corrections which may from time to time be necessary to cause the indications of the main tuning condenser 99 to be accurate. At 102 is shown what may be termed an air check condenser which is thrown into the circuit whenever the condenser 99 is turned to its zero position, this condenser being used to check the normality of circuit conditions and being also shown and its uses fully described in my application Serial No. 166,705. The condenser plates 1 and 2 are shown as connected in parallel with the condensers 99, 101 so as to act as a tuning element for the secondary circuit. The current flow in the secondary circuit induced by a given excitation of the primary circuit is measured by the thermo-ammeter or other suitable device as shown in the diagram of Figure 6 at 105. This measuring device is positioned at any suitable point and is connected to the binding posts 106 and 107 at the outer end of the casing 80 (see Figure 3).

It will thus be seen that all the mechanisms of the two oscillatory circuits, except the thermo-ammeter which indicates the measurement of the material passing between the condenser plates 1 and 2, is contained in the casing 80 and carried by the supporting jaws for the condenser plates. At 110 in Figure 1 are shown removable plugs by the removal of which access may be had to make adjustments in the various variable circuit devices which may need adjustment from time to time to cause the mechanism to properly register.

An embodiment of this invention having thus been described it should be evident to those skilled in the art that various changes and modifications might be made therein without departing from the spirit or scope of this invention as defined by the appended claims.

I claim:

1. In combination, a U shaped frame having a pair of spaced jaw portions, a conducting plate carried by each of said jaw portions, said plates being in opposed spaced relation, and heat insulating material positioned between said jaw portions along the bend of the U to protect said bend from temperature conditions of material positioned between said plates.

2. In combination, a U shaped frame having spaced parallel jaw portions connected at one end, said jaw portions having side walls and a web at said connection, a pair of condenser plates each plate carried by one of said jaw portions and normally spaced from said other plate a predetermined distance, a casing fixed to said web and extending between said side walls, a high frequency transformer system carried by said casing, said pair of condenser plates being connected to one side of said system as a tuning element, and means for measuring current flow for a given excitation of the primary side of said system in accordance with nearness to and departures from resonance of said primary and secondary sides.

3. In combination, a frame, a pair of condenser plates carried by said frame, one above the other, means for supporting the upper of said plates for vertical movement toward and from the lower plate, adjustable stops to limit the extent of downward movement of said upper plate to a predetermined spacing from said lower plate, a fluid pressure mechanism for lifting said upper plate, and a dash pot for controlling the downward movement of said upper plate to bring it accurately to stopped position.

In testimony whereof I have affixed my signature.

ALBERT ALLEN.